Dec. 10, 1968  L. A. MYERS  3,415,229
POULTRY WATER FOUNTAIN
Filed Oct. 19, 1965

Inventor
Lawrence A. Myers
By Olson, Trexler
Wolters & Bushnell
Attys.

United States Patent Office 3,415,229
Patented Dec. 10, 1968

3,415,229
POULTRY WATER FOUNTAIN
Lawrence A. Myers, Milford, Ind., assignor to Chore-Time Equipment, Inc., Milford, Ind., a corporation of Indiana
Filed Oct. 19, 1965, Ser. No. 497,813
3 Claims. (Cl. 119—80)

ABSTRACT OF THE DISCLOSURE

An animal water supply arrangement comprising a float box including a separate end panel having mounted thereon a liquid level responsive valve means for determining the amount of water in the supply arrangement. The separate end panel along with the valve means can be quickly connected to or disconnected from the float box by means of a quick connect-disconnect coupling means attached to the panel for fast, easy cleaning of the water supply arrangement.

---

This invention relates generally to poultry watering systems and more particularly to devices for maintaining a selected amount of water available to flocked birds.

One very common type of poultry watering system comprises a trough and a float-operated supply valve. In practice, the length and shape of the trough, as well as the level of water that is maintained in the trough, vary considerably between particular installations. In all sizes and shapes of watering troughs, but especially in the comparatively shallow and narrower troughs, proper control of the water level has proved to be difficult. In an effort to solve this control problem, large sized floats installed in generously proportioned float boxes have been employed. However, these latter arrangements have introduced difficulties in cleaning and in keeping the watering systems clean.

Therefore, an important object of the present invention is to provide an easily cleaned supply arrangement for poultry watering systems which gives accurate control of the water level.

A more general object of the invention is to provide a new and improved supply arrangement for watering systems.

Another object of the invention is to provide a supply arrangement for animal watering systems that is susceptible to adjusting the water level in a quick and easy manner.

Still another object of the invention is to provide a watering system supply arrangement in which a float and a float valve are quickly and easily removed from the cooperating float box for cleaning or replacement.

A further object of the invention is to provide a watering system supply arrangement that is readily adaptable to use in a wide variety of such systems.

These and other objects and features of the invention will become more apparent from a consideration of the following descriptions.

A supply arrangement in accord with the invention includes a float box unit having side and bottom panels, one of which is separate and the remainder of which are interconnected. Liquid level responsive valve means are mounted on the separate panel to be removable therewith; and quick-connect coupling units are employed in fastening the separate panel to the remainder of the float box unit.

In order that the principles of the invention may be readily understood, a single embodiment thereof, but to which the application is not to be restricted, is shown in the accompanying drawing wherein.

Figures 1, 2, 3, 4:
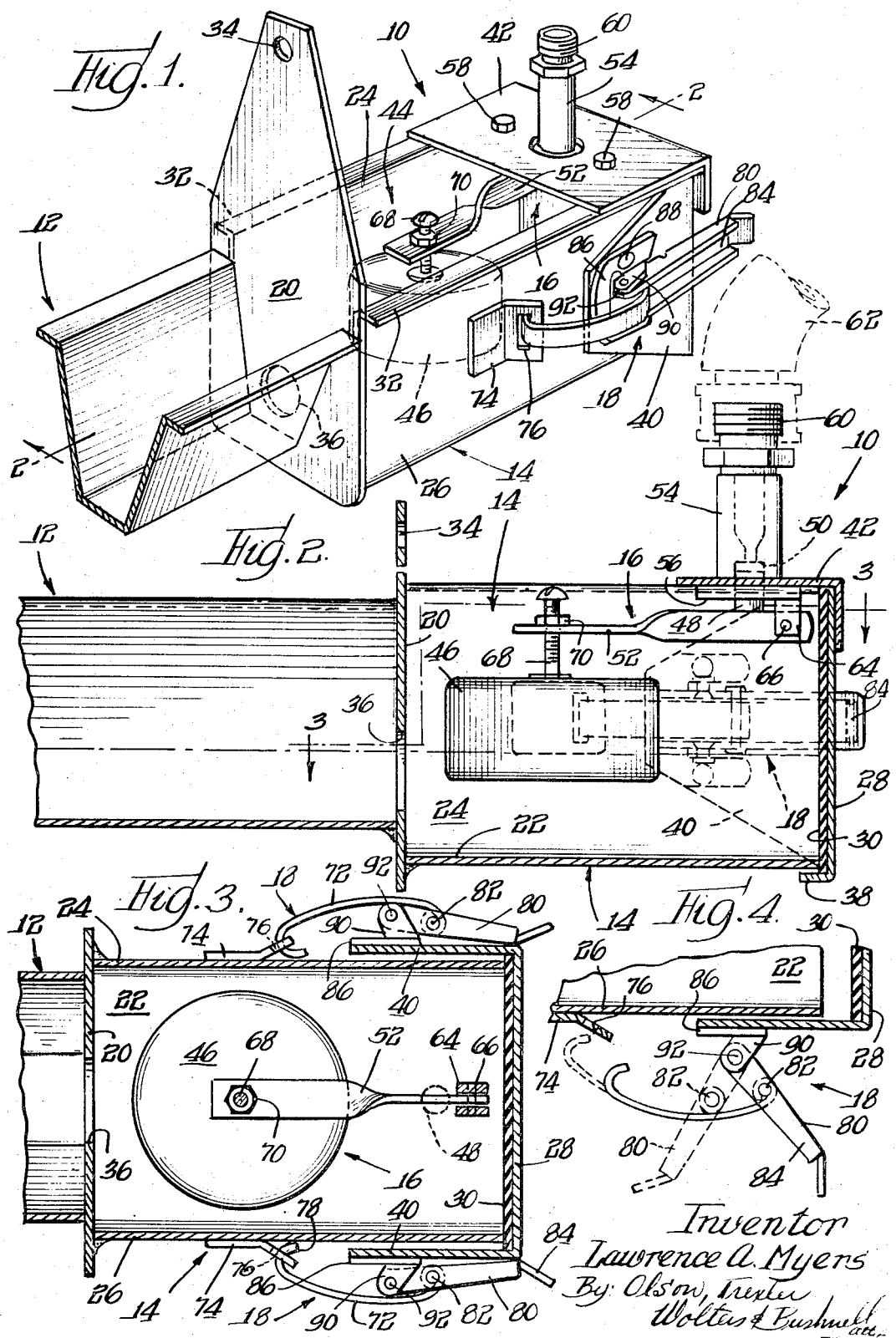
FIG. 1 is a perspective view of a supply arrangement constructed in compliance with the invention and shown attached to one end of a watering trough.
FIG. 2 is an enlarged view taken substantially along the line 2—2 of FIG. 1.
FIG. 3 is a top plan view taken substantially along the line 3—3 of FIG. 2.
FIG. 4 is a fragmentary view similar to the showing of FIG. 3 but illustrating the action of one of the quick-connect coupling units.

Referring now in detail to the drawing, specifically to FIGS. 1 and 2, a water fountain or supply arrangement indicated generally by the reference numeral 10 is assembled to a watering trough 12 to maintain a substantially constant amount of liquid therein. The trough 12 is shown to be of inverted frusto-pyramidal shape and of generous breadth and depth; however, troughs of other shapes and proportions may be equally well employed.

In accordance with the features of the present invention, the supply arrangement 10 includes a float box unit 14, a valve unit 16 and quick-connect coupling units or latches 18. More specifically, the float box unit 14 is made up of a forward side panel 20, a bottom panel 22 and opposite lateral side panels 24 and 26. The side panels 20, 22, 24 and 26 are interconnected to form a container for holding water. The box unit 14 also comprises a rear side panel 28 which is separate from the other panels so it may be removed. As will be realized from an inspection of FIGS. 1 and 2, the float box unit 14 is comparatively broad and flat bottomed in character. This is so in order that it may receive a float member of a size that is adequate for sensing and responding properly to small changes in the level of a rather shallow amount of water in the float box unit. Advantageously, a gasket 30 is situated between the separate panel 28 and the confronting edges of panels 22, 24 and 26. The gasket 30 serves to seal the panel 28 against water leakage and conveniently comprises a sheet of a suitable elastomer provided in an appropriate thickness and softness. In addition, the opposite side panels 24 and 26 may be fashioned with laterally extending flanges 32 to be used in supporting the float box unit. Similar flanges may, of course, be provided on the trough 12. Furthermore, the forward side panel 20 may be extended upwardly and perforated with a hole 34 for facility in suspending or elevating the float box unit and the associated end of the trough 12.

In order to provide communication between the float box unit 14 and the trough 12, the front side panel 20 is perforated with a water outlet aperture 36; and advantageously, the lower edge of aperture 36 is raised above the floor or trough 12 in order to provide a dam for retarding the passage of foreign matter from the trough into the float box unit. To help locate the rear side panel 28, that element is fashioned with a right angularly disposed bottom lip 38, best seen in FIG. 2; and in order to define mounting sites for the coupling units 18, side flanges 40 are provided at the opposite lateral edges of the rear side panel 28. In addition, a top mounting plate 42 is attached to the rear panel 28 at right angles therewith to support the valve unit 16. As is well shown in FIG. 1, the top mounting plate 42 extends only partly over the float box unit 14 whereby to define an open region 44 that affords access to a portion of the valve unit, as will be described more fully hereinafter.

Continuing with reference to FIGS 1 and 2, the liquid level responsive valve unit 16 comprises a level responsive float member 46, a reciprocable valve element 48 that selectively closes against an annular valve seat 50, and a swingably mounted lever 52 which carries the float member 46. The valve seat 50 is fashioned in a stem 54, stem 54 being fastened in upright condition to the mounting plate by means of an integral flange 56 that is disposed beneath the mounting plate and by means of cooperating bolts 58.

Other means of securing the stem 54 in place may of course be employed. A threaded fitting 60 is located at the upper end of stem 54 for use in coupling the valve stem to a flexible water hose 62 or other supply element.

The flange 56 carries a depending, bifurcated tongue 64 which is laterallly perforated to receive a pivot pin 66. Pin 66 penetrates the lever 52 for swingably mounting the same; and lever 52 extends its free end into alignment with the open region 44. A screw 68 threadedly enters a bore in the free end of lever 52 for adjustably mounting th float 46 to the lever. In addition, the lower end of screw 68 is suitably fastened in the material of float member 46; and a lock nut 70 is advantageously employed in securing a given position of vertical adjustment of the float member relative to the lever. As will be recognized, the screw 68 is readily accessible for readjustment because of its situation in vertical alignment with the open region 44.

Turning to a consideration of FIGS. 1, 3 and 4, the coupling units 18 are seen to be similarly constructed as mirror images of each other. Each of the coupling units 18 includes a latching member 72 and a cooperatively positioned strike bracket 74, the bracket 74 being apertured with a hole 76 for receiving a hooked tip 78 of the member 72. The strike bracket 74 is welded or otherwise suitably fastened to the side of float box unit 14, and the latching member 72 is swingably mounted to a link 80 by a pivot pin 82. Advantageously, the link 80 is provided with an extension 84 which may be employed in manually grasping and operating the coupling unit 18. For use in mounting the link 80 in position, a bracket 86 is attached to the corresponding side flange 40 by means of rivets 88 or other suitable means. The bracket 86 has vertically spaced ears 90 that extend laterally outwardly to carry a pivot pin 92 swingably mounting the link 80 to the bracket 86. The coupling unit 18 achieves a locking action by overcentering the pin 82 relative to the pin 92 in the latched condition which is illustrated in FIGS. 1 and 3, the strike bracket 74 being positioned to draw slight tension in the latching member 72 in this coupled position whereby to preserve the latching action. Two intermediate positions of the latching member 72 and the link 80 are shown in FIG. 4.

From the foregoing descriptions, it will be apparent that the device of the invention provides accurate control of the water level by providing a generously sized float and a broad beamed container. At the same time, the float and its cooperating valve are easily cleaned because they may be quickly and easily removed from the float box by simply decoupling the units 18. In the disassembled condition, the float and valve are easily manipulated for cleaning and are accessible for replacement. Furthermore, the water supply arrangement of the invention may be readily employed in a variety of systems since the float box and the valve unit are separate from the trough that actually delivers water to the stock. Furthermore, the means for adjusting the position of the float is readily accessible through the open top of the float box unit.

While a particular embodiment of the invention has been shown, it should be understood, of course, that the invention is not limited thereto since many modifications may be made; and it is, therefore, contemplated to cover by the present application any such modifications as fall within the true spirit and scope of the appended claims.

The invention is claimed as follows:

1. An animal water supply arrangement comprising: a watering trough having a predetermined depth and including an open end; a float box having a depth greater than that of said trough and including a pair of side panels, a pair of end panels and a bottom panel, said side panels, one of said end panels and said bottom panel being interconnected, said one end panel having a water outlet therein and being attached to said open end of said trough so that water from said float box flows therefrom through said water outlet into said trough, said other outer end panel being separate from said side and bottom panels and being removably disposed against end edges thereof; liquid level responsive valve means mounted on said separate end panel to be removable therewith; and quick-connect coupling means fastening said separate panel against said end edge of said side and bottom panels.

2. A water supply arrangement according to claim 1 wherein said quick-connect coupling means includes over-center fastening units.

3. A water supply arrangement according to claim 1 which further comprises gasket means between said separate panel and said interconnected panels.

References Cited

UNITED STATES PATENTS

| | | | |
|---|---|---|---|
| 2,113,345 | 4/1938 | Haymond | 137—439 X |
| 2,708,435 | 5/1955 | Lewis | 137—408 X |
| 2,786,596 | 3/1957 | Mantle. | |
| 2,794,445 | 6/1957 | Jennings | 137—443 X |
| 3,101,071 | 8/1963 | Frye | 119—78 |
| 3,185,134 | 5/1965 | Sheets | 119—80 |

FOREIGN PATENTS 1,205,782  8/1959  France.

WILLIAM F. O'DEA, *Primary Examiner.*

D. R. MATTHEWS, *Assistant Examiner.*

U.S. Cl. X.R.

137—428, 444, 574